May 26, 1953   P. ROSENBERG   2,639,789
EXTENSIBLE JOINT STRUCTURE
Filed Dec. 3, 1947
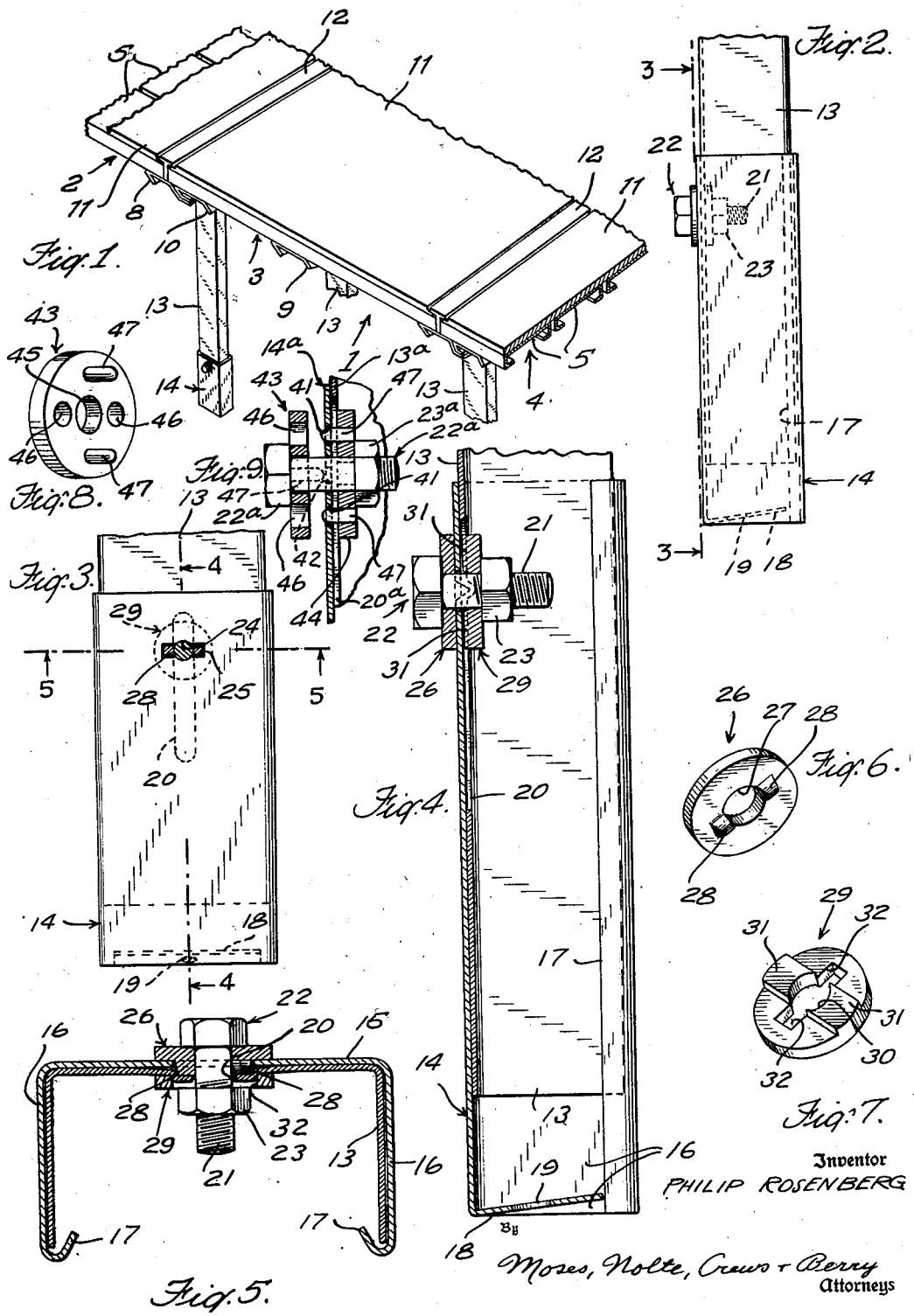
Inventor
PHILIP ROSENBERG
By Moses, Nolte, Crews & Berry
Attorneys Patented May 26, 1953

2,639,789

UNITED STATES PATENT OFFICE 2,639,789

EXTENSIBLE JOINT STRUCTURE

Philip Rosenberg, New York, N. Y., assignor to Universal Steel Equipment Corporation, Long Island City, N. Y., a corporation of New York Application December 3, 1947, Serial No. 789,519

2 Claims. (Cl. 189—36)

This invention relates to extensible joints, and more particularly to joints of table legs which are adjustable in length. While the utility of the invention is not confined to table legs of adjustable length the invention has been contrived with that use primarily in view and will therefore be illustratively shown and described herein in connection with such use.

In cutting room work and in many other commercial operations it is important to provide a long table composed of a plurality of sections joined end to end. It is important that the top of the plural section table shall be continuously smooth and level, even though the floor of the room in which the table is situated may be sloping or of irregular contour.

It has been common practice heretofore to provide the table legs with adjustable shoes or lower sections so that the legs can be individually adjusted in length when the table is installed. A common expedient has been to provide an upper, channeled, sheet metal leg member and a lower, sheet metal shoe member into which the upper member is telescoped, one of said members being slotted and the other perforated, and to use a bolt and nut combination together with one or more lock washers for clamping the members together as securely as possible in adjusted relation.

A construction of the kind referred to has the disadvantage that the holding means acts in an impositive manner. When a porter drops a heavy bundle of material on the table there is apt to be a slight slipping of the leg and shoe relative to one another, and as time goes on one or more of the legs may come to be shortened substantially, so that the table top becomes objectionably uneven.

It is the primary object of the present invention to provide an extensible joint in which the drawback referred to is obviated.

To this end the upper leg member and shoe are provided as before, together with a bolt and nut combination. In addition, however, means are provided in association with the nut and bolt for effecting a positive interconnection of the parts capable of holding them in fixed relation to one another without the possibility of slipping.

For accomplishing this purpose a pair of die members of novel construction is provided. These members desirably take the form of washers. In accordance with one embodiment, one of the washers is formed with one or more projections or teeth which are adapted to be passed through perforations formed in one of the members to be joined, and to engage wall material of the second member to be joined alongside a slot formed therein. The second washer is formed with one or more recesses, into which the wall material of said second member may be displaced and fitted by deforming it beyond its elastic limit. The bolt is passed successively through the first washer, the first and second members to be joined and the second washer. The tightening of the nut on the bolt serves to effect the positive interlocking of the slotted member with the second washer. The bolt shank fixes the relation of the two washers and the first joint member to one another while the deformation of the wall material of the second joint member into the second washer positively locks the second joint member in fixed relation to the second washer, thereby securing the joint members positively in the desired adjusted relation to one another.

In accordance with a further embodiment the washers may be duplicates of one another. Each washer carries two pins upon one diameter and is formed with two openings upon a diameter at right angles to the first. The unslotted member to be joined is formed with four quadrangularly related holes for receiving all four washer pins to establish and maintain a desired orientation of the washers to one another. The pins of one washer displace wall material of the slotted member into the holes formed in the other washer.

Other objects and advantages will hereinafter appear.

In the drawing forming part of this specification,

Figure 1 is a fragmentary, perspective view of a sectional table having legs in which the invention is utilized;

Figure 2 is a fragmentary view in side elevation of table leg and shoe members, together with the parts for securing these members in fixed, adjusted relation to one another;

Figure 3 is a fragmentary view in sectional front elevation of the parts illustrated in Figure 2, the section being taken upon the line 3—3 of Figure 2, looking in the direction of the arrows;

Figure 4 is a fragmentary view in sectional elevation, upon a larger scale than the preceding figures, the section being taken upon the line 4—4 of Figure 3, looking in the direction of the arrows;

Figure 5 is a horizontal sectional view on the same scale as Figure 4, the section being taken upon the line 5—5 of Figure 4, looking in the direction of the arrows;

Figure 6 is a perspective view of a toothed die washer employed in the joint structure;

Figure 7 is a perspective view of a ribbed and recessed washer employed in the joint structure;

Figure 8 is a perspective view of a washer of the kind utilized in a modified structure embodying the invention; and Figure 9 is a fragmentary, sectional view showing two of the washers of Figure 8 assembled with the members to be joined and with a bolt and nut combination, but before the nut has been tightened on the bolt.

While the invention is susceptible of a wide variety of uses, an illustrative embodiment is shown and will be described herein as utilized in a sectional table 1 of the kind shown and described in Letters Patent of the United States No. 2,327,743, granted to me on August 24, 1943, for Sectional Table.

The illustrative table 1 comprises three or more sections 2, 3 and 4. The several sections are essentially duplicates of one another. Each table section top is made up of a series of longitudinal sheet metal channel bars 5 which are connected to one another by transverse tie members 8, 9 and 10 in the form of sheet metal channel members. The tie members 9 are located intermediate the ends of a section and may be plain channel members, while the tie members 8 and 10 are located at opposite ends of a section, and are of special construction for use in securing the sections to one another. Each table section is provided with a non-metallic top member 11, and joint bars 12 are interposed between adjacent top members 11 and have their top surfaces flush with said members as described in the patent referred to.

The table legs desirably comprise sheet metal channel members 13, each having the upper end secured in one of the channel bars 8, 9, 10, and being braced or reinforced in any suitable manner. Each upper leg member 13 is adjustably connected with a lower member or shoe 14 which is fitted upon its lower end. Each shoe 14 comprises a central body web 15 and side webs 16, the latter webs including also marginal portions 17 which are folded inward to extend around the free margins of the channeled leg member 13. The lower end of the central body web 15 is folded inward to provide an attaching web 18. The web 18 is formed with a perforation 19 through which a screw may be passed for attaching the shoe 14 to a floor.

The channeled leg member 13 is formed in the central body web thereof with a longitudinal slot 20 through which the shank 21 of a headed bolt 22 is adapted to be freely passed. A nut 23 is adapted to be threaded upon the shank 21 of the bolt 22.

All of the illustrative structure as thus far described in detail is well known and forms per se no part of the present invention.

The web 15 of the shoe is formed with a perforation 24, in line with the slot 20, through which the shank 21 of the bolt 22 may be passed. The perforation 24 is desirably provided with side extensions 25.

The first die washer 26 is formed with a perforation 27 through which the shank 21 of the bolt 22 may be passed. Alongside the perforation 27 the washer includes projections or teeth 28 which are adapted to be inserted through the perforation extensions 25 of the web 15 and into engagement with wall material of the leg member 13 alongside the slot 20. Since the teeth 28 fit into the perforation extension 25 the washer 26 is held against rotation, as well as against bodily movement relative to the web 15 of the shoe.

A second die washer 29 is provided, the washer being formed with a perforation 30 through which the shank 21 of the bolt 22 may be passed. The washer is also formed with a rib 31 which is adapted to enter the slot 20 and to fit between the side walls of the slot, for holding the washer against rotation in properly oriented relation to the first washer. The washer 29 is further formed with perforated or recessed areas 32 in alignment with the perforation extensions 25 and with the washer teeth 28, when the washer 29 is impaled upon the bolt shank and the rib 31 is located in the slot 20.

With the parts thus assembled the nut 23 is screwed onto the bolt shank to force the washers 26 and 29 toward one another. As the nut is tightened the washer 29 is held against rotation by engagement of the rib 31 with the walls of the slot 20 and hence the recesses 32 are maintained in alignment with the teeth 28 of the washer 26. The teeth 28 force the wall material of the leg member 13 into the recesses 32, causing such material to be permanently deformed beyond its elastic limit.

When the operation is complete the washer 26 has its teeth passed through the web 15 of the shoe and fitted into recesses of the leg member 13. The leg member 13 has the deformed portions thereof fitted into recesses of the washer 29. Since the bolt fixes the relation of the washers 26 and 29, and the shoe 14 to one another, and the relation of the leg member 13 to the washer 29 is fixed, the leg member 13 and the shoe 14 are positively secured against relative longitudinal movement. The fact that the teeth 28 fit through the shoe 14 and into the indentations formed by the teeth in the member 13 also contributes to this result.

Should the table after a time be transferred to a new location, or should the table in the course of time become uneven through settling of the building structure or warping of the floor, the table top can be leveled up again by re-adjustment of the table legs. In re-adjusting a table leg the nut 23 is partially backed off and shoe 14 is shifted relative to the leg member 13 into the new relationship desired. The nut is again tightened on the bolt to again produce a positive interlock as previously described. Should the new deformation of the leg member 13 overlap the old, the die washers will act to even out and restore to their original condition the portions of the deformations which should no longer be maintained, at the same time displacing material of the leg member 13 in precisely the areas required to form the desired new deformation for effecting the interlock.

It is not essential that the recesses 32 extend completely through the washer 29, but such a construction is found to be convenient and economical to provide and is generally to be preferred.

The die washers 26 and 29 are desirably of substantially harder material than the sheet metal members 13 and 15 so that they may deform the sheet metal members without themselves suffering substantial deformation. The sheet metal members are commonly formed of soft steel, but may be formed of other metals, such as aluminum or its alloys, if desired. The washers are desirably composed of hardened steel or steel alloy. The die members are referred to as washers simply because the bolt passes through them. They may be of any convenient size and configuration desired.

In the construction illustrated in Figure 9 the upper leg section 13a is of the same construction as the leg section of Figures 2 to 5, but the shoe 14a, though generally similar, is of modified construction. The shoe 14a is provided with a circular opening 24a having a diameter equal to the width of the slot formed in the upper leg section 13a for passing the shank of the bolt 22a. The shoe is also provided with four quadrangularly related small circular openings, two of these, designated 41, having their axes disposed in the vertical plane in which the axis of the opening 24a lies, and the other two, designated 42 (only one shown), having their axes disposed in the horizontal plane in which the axis of the opening 24a lies.

The bolt 22a and the nut 23a may advantageously be duplicates of the bolt 22 and the nut 23, respectively, but washers 43 and 44 are utilized which are of distinctive construction and which are duplicates of one another. A description of the washer 43 of Figure 8 will suffice for the washer 44 also.

The washer 43 is desirably of hardened steel. It is formed with a large central opening 45 and with diametrically opposed small openings or recesses 46. The axes of the openings 46 lie in a common plane with the axis of the opening 45. Upon a second diametrical plane at right angles to the first a pair of still smaller recesses is provided, and in these recesses short pins 47 are secured which extend from the washer parallel to the axis of the opening 45. The pins 47 are desirably rounded at their outer ends. The pins may be made integral with the washers if preferred.

In assembling the parts the washer 43 is impaled upon the shank of the bolt 22a with its pins 47 passed through the openings 42 of the shoe 14a and engaged with the wall material of the leg section 13a. The other washer 44 is then impaled upon the bolt shank and its pins 46 are passed through the slot of leg section 13a and into the openings 41 of the shoe 14a. This fixes the washers in a desired orientation with reference to one another with the pins 47 of the washer 43 in alignment with the openings or recesses 46 of the washer 44. The openings 41 and 42 pass the pins 47 snugly but without friction or binding. The openings 46, however, are of considerably larger diameters than the pins 47, so that the pins 47 of the washer 43 can displace metal of the leg section 13a into the openings 46 of washer 44, and can themselves enter such openings surrounded by the displaced metal of the member 13a.

When the members 13a and 14a have been properly adjusted the nut 23a is screwed up tightly on the bolt 22a to lock the parts positively in adjusted relation. The openings 46 perform no function in the washer 43 but are provided simply because it is found advantageous to make the washers in all respects duplicates of one another so that they may be interchangeably used.

When desired the parts shown in Figure 9 can be re-adjusted in the manner previously described in connection with the other illustrative embodiment of the invention.

I have described what I believe to be the best embodiments of my invention. I do not wish, however, to be confined to the embodiments shown, but what I desire to cover by Letters Patent is set forth in the appended claims.

I claim:

1. An adjustable joint forming combination, comprising a pair of die washers, a pair of sheet metal members to be joined, a nut and a bolt, the first member to be joined being formed with a longitudinal slot and the second member to be joined being formed with a major opening to pass the bolt shank and with quadrangularly related smaller openings disposed about said major opening, the die washers being duplicates of one another and each including a central opening to pass the bolt shank, a pair of projecting pins disposed upon one diameter at opposite sides of the central opening and a pair of recesses disposed at opposite sides of the central opening upon a second diameter at right angles to the first, the first washer having its pins fitted through the second member and into engagement with wall material of the first member, and the second washer having its pins inserted through the slot of the first member and fitted into the other pair of openings in the second member, and the nut being tightened on the bolt to clamp the washers together and thereby cause the pins of the first washer to displace wall material of the first member into the recesses of the second washer for effecting a permanent interlock.

2. A rigid die washer for use in an extensible joint of the kind described, said washer having a major circular perforation, a pair of pins disposed upon a common diameter at opposite sides of said major perforation, and a pair of abruptly shouldered recesses of larger diameter than the pins disposed at opposite sides of the major perforation upon a second diameter substantially at right angles to the first.

PHILIP ROSENBERG.

References Cited in the file of this patent

UNITED STATES PATENTS

| Number | Name | Date |
|---|---|---|
| 417,580 | Page | Dec. 17, 1889 |
| 1,435,433 | Triggs | Nov. 14, 1922 |
| 1,450,460 | Smith | Apr. 3, 1923 |
| 1,830,729 | Wood | Nov. 3, 1931 |
| 1,902,454 | Kirton | Mar. 21, 1933 |
| 1,986,980 | Ross | Jan. 8, 1935 |
| 2,013,059 | Leslie | Sept. 3, 1935 |
| 2,374,743 | Granville | May 1, 1945 |
| 2,432,257 | Stetzer | Dec. 9, 1947 |